April 1, 1947. E. J. KIMM ET AL 2,418,231
BOOSTER PUMP AND TANK ASSEMBLY
Filed Jan. 24, 1944
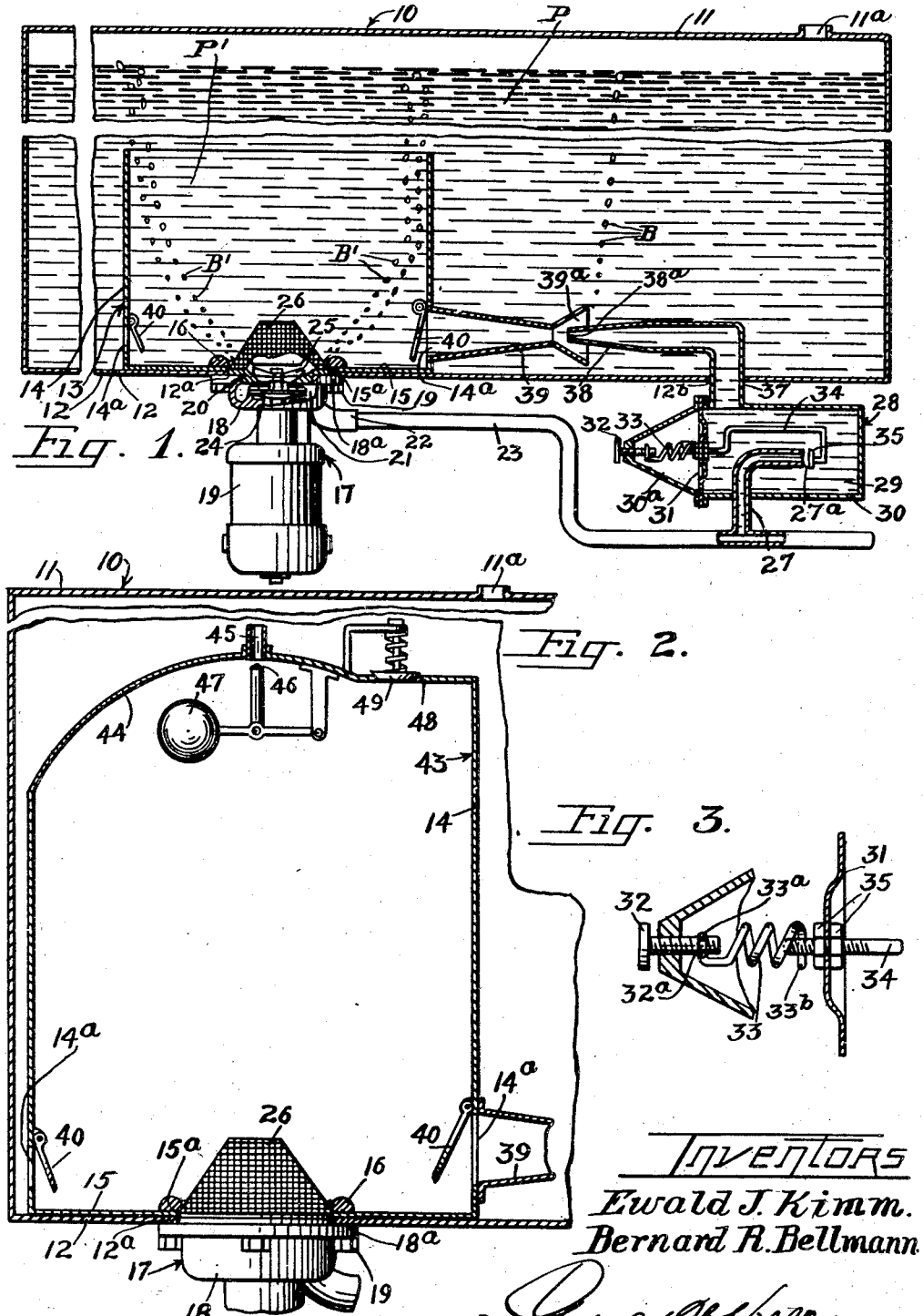

Patented Apr. 1, 1947

2,418,231

UNITED STATES PATENT OFFICE 2,418,231

BOOSTER PUMP AND TANK ASSEMBLY

Ewald J. Kimm and Bernard R. Bellmann, Dayton, Ohio, assignors to Curtis Pump Company, Dayton, Ohio, a corporation of Ohio Application January 24, 1944, Serial No. 519,420

14 Claims. (Cl. 103—113)

This invention relates to a pump and tank assembly arranged for the maintenance of a high head of material to be pumped above the inlet of the pump even when the main portion of the material is at a relatively low level above the pump inlet.

Specifically, the invention relates to a fuel system, such as an aircraft fuel system, wherein fuel in a tank is fed to a separate compartment or chamber having relatively small capacity as compared with the tank and being in direct communication with a booster pump and agitator which beats and agitates the fuel about to enter the pump and throws out or rejects any gases and vapors in the fuel so as to prevent vapor lock in the fuel line.

A feature of the invention is the provision of an eductor in a fuel tank communicating with the tank and with a sub-compartment in the tank and actuated by pressurized fuel pumped from this sub-compartment whereby the eductor draws in fuel from the tank to supply the sub-compartment with fuel.

A further feature of the invention is the provision of a booster pump and eductor arrangement wherein part of the fuel pressured by the pump into a fuel line is tapped from this fuel line through a pressure regulator and then fed under controlled constant pressure to the eductor for causing the eductor to draw fuel from a main tank into a sub-tank and maintain a relatively high head of fuel above the pump in this sub-tank.

The invention will hereinafter be specifically described as embodied in an airplane fuel system, but it should be understood that the principles of this invention are not limited to such an embodiment being generally applicable to fluid treatment systems and especially fuel treatment systems.

The booster pumps suspended on the bottoms of airplane fuel tanks for pressurizing fuel from the tanks into fuel lines to the engine driven fuel pumps of airplane engines have been highly successful in increasing the altitude range of aircraft by preventing vapor lock in the fuel line. The booster pumps are preferably equipped with agitators to beat out all gases and vapors from the liquid fuel entering the pumps so that only fully liquid fuel is pressured into the fuel lines. The beaten out gases and vapors are vented out of the tanks into the atmosphere.

The agitating device on the booster pump is usually exposed to the entire pond of fuel in the fuel tank on which the pump is mounted and acts on any portion of the fuel in the tank which happens to be adjacent to the agitators. Therefore, a large quantity of fuel which is not immediately pumped into the fuel line is beaten and relieved of the occluded gases and vapors therein. In addition, highly volatile liquids, about to become gases, are gasified by the agitators. This agitation of the fuel that is not immediately pumped out of the tank is unnecessary and wasteful because highly desirable volatiles in the fuel are eliminated and vented out of the tank.

This invention now provides a small chamber or compartment within the fuel tank for housing the fuel about to be pumped, and this fuel only is subjected to the agitation treatment. In addition, the fuel in the small chamber is maintained at a relatively high level above the inlet of the pump since the pump functions best when it receives the fuel under an appreciable head pressure. The pump itself is used to maintain a high head of fuel in the small chamber or compartment by supplying the fuel from the main tank. For this purpose, some pressurized fuel from the pump is fed through a pressure regulator and discharged at a constant pressure through an eductor which draws fuel from the main tank and ejects it into the compartment in the main tank. At the same time the eductor further agitates or pre-treats this fuel being drawn into the compartment, thereby feeding a pre-treated fuel into the compartment where it can be further treated by the agitator on the booster pump.

It is then an object of this invention to provide a fuel system of the booster pump type which maintains a high head of fuel above the inlet to the booster pump.

A further object of the invention is to provide a booster pump and tank assembly arranged so that pressurized material from the pump is utilized to maintain a high head of fuel above the inlet to the pump.

A still further object of the invention is to provide a pump and eductor arrangement in a fuel system which utilizes some of the fuel pressured by the pump to actuate the eductor for drawing fuel into a small localized chamber communicating with the inlet of the pump.

A still further object of the invention is to provide an arrangement of an agitating type booster pump wherein material treated by the pump is fed to the vicinity of the pump by an eductor which is actuated by pumped material.

A still further object of the invention is to increase the efficiency of booster pump airplane fuel systems by localizing fuel about to be fed to the booster pump in a sub-chamber and maintaining an appreciable head of fuel in this chamber.

Other and further objects of the invention will be apparent to those skilled in the art from the following detailed description of the annexed sheet of drawings which, by way of preferred examples only, illustrates two embodiments of the invention.

On the drawings:

Figure 1 is a broken, vertical cross-sectional, somewhat diagrammatic view, with parts in elevation, of a booster pump and tank arrangement according to this invention.

Figure 2 is a broken, fragmental, vertical cross-sectional, somewhat diagrammatic, fragmentary view of another type of booster pump and fuel tank arrangement according to this invention.

Figure 3 is a fragmentary, enlarged vertical cross-sectional view, with parts in elevation, of a portion of the pressure regulator.

As shown on the drawings:

In Figure 1, the reference numeral 10 designates generally a fuel tank having a top wall 11 with a vent 11a therein and a bottom wall 12 with a large hole 12a therethrough and a smaller hole 12b therein. Within the tank 10 there is provided an open topped container 13 having a side wall 14 with openings 14a therein and a bottom wall 15 resting on the bottom wall 12 of the tank and having an opening 15a therethrough aligned with the opening 12a of the bottom wall 12.

A mounting ring 16 is mounted in the container 13 on the bottom wall 15 thereof around the hole 15a therein.

A booster pump and electric motor unit 17 including a pump casing 18 and a motor casing 19 is suspended on the bottom of the tank assembly 10. As shown, the pump casing 18 has an outturned annular flange 18a adapted to receive mounting studs 19 therethrough which studs 19 are threaded into the mounting ring 16 whereby the unit 17 is suspended from the bottom of the tank 10.

The pump casing 18 has a throat ring 20 in the open top thereof projecting through the holes 12a and 15a of the tank and container to define an inlet joining the interior of the container 13 with a volute or pumping chamber 21 in the casing 18. This volute chamber discharges through a fitting 22 into a fuel line 23 and an impeller 24 driven by the electric motor in the casing 19 and mounted so as to span the opening of the throat ring 20 and communicate around its periphery with the pumping chamber 21 serves to pump material from the container 13 into the fuel line 23.

The pump unit 17 has an agitating propeller 25 driven with the impeller 24 and disposed in free communication with the interior of the container 13 for agitating the material in the container.

A conically shaped screen 26 is mounted on the throat ring 20 to filter material being fed to the pump.

The tank 10 contains a pond P of liquid fuel such as gasoline and the container 13 in the tank 10 contains a pond P' of the fuel.

As also shown in Figure 1, fuel in the pond P' is agitated by the propeller 25 and this propeller beats out bubbles B' of gas and vapor and ejects non-liquids away from the pump inlet so that only fully liquid fuel will be pumped by the impeller 24 into the fuel line 23. These bubbles B' are beaten out from the liquid fuel in the bottom of the pond P' in a lateral stream which gradually rises around the screen 26 and out of the open top of the container 13 through whatever portion of the pond P is above the top of the container 13. The bubbles burst at the surface of the pond P and discharge the gases and vapors into the atmosphere above the pond where they bleed out of the tank 10 through the vent 11a. Of course, if the pond P is at a level below the top of the pond P' the bubbles B' will burst at the surface of the pond P' directly into the atmosphere above the fuel in the tank 10 and be liberated out of the vent 11a.

A tube 27 joins the fuel line 23 with a pressure regulator 28. As shown, this tube 27 has a discharge mouth 27a in the central portion of a chamber 29 provided by a rigid walled container 30 having a tapered end 30a with a flexible diaphragm 31 spanning the large end of the tapered portion 30a and forming a flexible end wall for the chamber 29. A spring retainer 32 is threaded through the small end of the tapered portion 30a and, as best shown in Figure 3, has a groove 32a in the shank portion thereof receiving the end coil 33a of a helically coiled spring 33. The other end coil 33b of the spring 33 is anchored in a rod 34 having nuts 35 threaded thereon and clamping the flexible diaphragm 31 therebetween.

The rod 34, as best shown in Figure 1, extends through the chamber 29 in front of the discharge mouth 27a of the tube 27 and carries a valve head 35 on the end thereof adapted to close this discharge mouth 27a and bleed out, under a pressure determined by the tension of the spring 33, fluid from the tube 27 into the chamber 29 where this fluid will fill the chamber and act on the diaphragm 31 to aid the spring 33 in seating the valve head 35a on the mouth 27a. This arrangement makes possible the maintenance of a predetermined pressure in the chamber 29 since the spring 33 can be set by the regulator 32 to urge the valve head 35 toward the discharge mouth 27a under a selected tension. The valve head will be moved away from the discharge mouth by the pressure in the tube 27 and the fluid can bleed out of the tube into the chamber 29 until fluid in the chamber 29 is under pressure sufficient to act on the diaphragm 31 and aid the spring 33 in again seating the valve head 35 on the mouth 27a.

As a result, the device 28 maintains a constant pressure in the chamber 29 irrespective of the variation in the pressure in the fuel line 23.

The hole 12b in the bottom wall 12 of the tank 10 receives a tube 37 therethrough joining the chamber 29 of the pressure regulator 28 with a nozzle 38 discharging into an eductor 39. The eductor 39 discharges through an opening 14a in the side wall of the container 13 into the interior of this tank.

As shown, the eductor 39 has an inlet mouth 39a communicating with the pond P in the main tank 10, and the nozzle 38 has a discharge outlet 38a in the center of this eductor mouth 39a.

Pressurized fuel from the fuel line 23 is bled through the tube 27 and discharged through the pressure regulator 28 at a predetermined constant pressure into the nozzle 38 where it discharges into the eductor mouth 39a and draws fuel from the pond P into the eductor 39. The nozzle discharge causes agitation of the fuel and liberates bubbles B of gas and vapor from the fuel. These bubbles B rise through the pond P to the surface where they burst into the atmosphere above the pond and are vented out of the tank thru the vent 11a.

Fuel from the pond P is thus injected into the pond P1 and as it is injected it is pre-treated or agitated to relieve some of the occluded gases and vapors therein. The pond P' receiving the pre-treated fuel, has the fuel therein further agitated by the propeller 25 and since the pond P' is relatively small compared with pond P only a small portion of the total fuel in the tank 10 is brought to equilibrium by agitation induced by the booster pump.

The container 13 is kept filled to the open top thereof even though the level of the pond P may drop below the top of the container 13 since the nozzle and eductor arrangement will inject fuel into the pond P1 to maintain the tank 13 filled.

The openings 14a in the tank wall 14 are adapted to be closed by flap valves 40 hinged to the tank wall 14 and the openings 14a are closed unless pressure on the outside of the container 13 is greater than the pressure on the inside of the container. Thus, in the event of clogging of the mouth 39a of the eductor or malfunctioning of the pressure regulator 28 the pond P' can still receive fuel through an opening 14a even when the level of the pond P is below the level of the open top of the container 13. Closing the opening 14a communicating with the eductor 39 is effective to hold liquid in the pond P' when the mouth 39a of the eductor is above liquid in the tank 10 as when the liquid level in the tank 10 is quite low and the tank is tilted to uncover the mouth 39a.

In the embodiment of the invention shown in Figure 2, parts identical with parts described in Figure 1 have been marked with the same reference numerals. In Figure 2, a closed container 43 is provided in place of the open topped container 13 of Figure 1. This container 43 is mounted on the bottom wall 12 in the tank 10 as in Figure 1 and has the side wall 14 with the openings 14a adapted to be closed by the flap valves 40 and with one of the openings 14a connected to the eductor 39. The container 43 also has the bottom wall 15 with the opening 15a aligned with the opening 12a of the bottom wall 12 of the tank 10 to receive structure of the booster pump 17 therethrough. In addition, however, the tank 43 has a top wall 44 with a vent 45 adapted to be opened and closed by means of a float controlled needle valve 46 having a float ball 47 adapted to float on the pond of fuel in the container. In addition, the top wall 44 has an opening 48 therein normally closed by a spring pressed release valve 49. Any vapor or air arising in the container 43 by operation of the eductor and booster pump will be vented out of the container through the vent 45 whenever liquid level in the container is such that the needle valve 46 opens this vent 45. Any surplus fuel pumped into the container 43 by the eductor can be released by means of the release valve 49. If desired, the release valve can be eliminated by permitting the fuel pressure in the container 43 to increase to the point where the eductor will cease to pump additional fuel into the container. This additional pressure within the container will aid the booster pump.

From the above description it will be understood that the invention provides a booster pump and tank assembly which maintains a high head of liquid material above the inlet of the pump, which confines the liquid material in the proximity of the pump so that only a small portion of this material is brought to equilibrium by the agitator of the pump and which enhances agitation of the fuel through the action of the nozzle in an eductor.

It will, of course, be understood that various details of the process may be varied through a wide range without departing from the principles of this invention, and it is, therefore, not the purpose to limit the patent granted hereon otherwise than necessitated by the scope of the appended claims.

We claim as our invention:

1. In combination, a first container, a second container within the first container, a pump communicating with the second container to pump material therefrom, a device in said second container associated with said pump for flowing bubbles of gas and vapor away from the pump, a vent for bleeding gases and vapors out of the containers, an eductor communicating with the first container and discharging into the second container, and a nozzle for said eductor communicating with the discharge side of said pump to receive pressurized material therefrom for drawing material from the first container into the second container.

2. In combination, a tank, a small container within said tank, a pump communicating with the bottom of the small container to pump material therefrom, propeller means in said small container associated with said pump arranged to liberate bubbles of gas and vapor and flow the liberated bubbles away from the pump, a vent for bleeding gases and vapors from the containers, and means actuated by material pressured from said pump to charge the container with material from the tank.

3. In combination, a main tank adapted to contain a pond of liquid fuel, a container within said tank having a vented top, a booster pump communicating with the bottom of said container having an agitating device associated therewith for beating out bubbles of gas and vapor from fuel in the container received from the pond of fuel in the tank, and an eductor in said tank discharging into said container operated by pressurized fuel from the pump for charging the container with fuel to maintain a high head of fuel in the container for more efficient operation of the pump.

4. In a fuel system, a fuel reservoir, a small fuel container, a pump communicating with the bottom of said container having an agitating device associated therewith to beat out bubbles of gas and vapor from the fuel in the container about to enter the pump, said pump having pumping means for pressurizing liquid fuel from the container, a pressure regulating device receiving pressured fuel from the pump, an eductor in said fuel reservoir having a nozzle receiving pressurized fuel from said pressure regulating device, and a discharge outlet communicating with said container whereby fuel about to be pumped is locally agitated in the container and fed to the container from the reservoir by fuel that has been pumped.

5. In combination, a fuel tank, an open topped container in said tank, a booster pump communicating with said container, an agitating device associated with said booster pump to beat out bubbles of gas and vapor from the fuel in said container, an eductor having an inlet mouth communicating with said tank, a discharge outlet communicating with said container and an actuating nozzle communicating with the discharge side of said pump for charging fuel from the tank into the container to maintain a high head of fuel above the pump, and said eductor agitating fuel in the tank to pre-treat the fuel being charged into the container.

6. A booster pump and tank arrangement comprising a main tank, a container in said main tank, an electric motor driven centrifugal booster pump suspended on the bottom of the main tank having an inlet opening communicating with the container and an agitating propeller in communication with the interior of the container, an eductor in the main tank discharging into the container, a nozzle communicating with the discharge side of the pump and discharging into said eductor, and a pressure regulating device maintaining constant pressure in said nozzle to uniformly agitate fuel being charged into the container.

7. A pumping system comprising a source of liquid, a container, a pump having an inlet communicating with the container and an outlet receiving pressured liquid from the inlet, a propeller in said container associated with said pump for flowing bubbles of gas and vapor away from the pump inlet, said container having a vent for releasing gases and vapors from said bubbles, and a device actuated by pressured liquid from said outlet supplying liquid from the source to said container for maintaining a head of liquid above the pump inlet.

8. A fuel system for delivering fully liquid fuel under pressure comprising a source of liquid fuel, a small container, a pump having an inlet communicating with the bottom portion of the small container and an outlet for delivering pressured fuel, an agitating flow inducing device communicating with the source for liberating bubbles of gas and vapor from the fuel and for flowing pre-agitated fuel to the container to maintain a head of fuel above the pump inlet, and an agitator exposed in said container for beating the pre-agitated fuel therein to liberate additional bubbles of gas and vapor therefrom before the fuel enters the pump whereby only fully liquid fuel is pumped.

9. A fuel system for delivering fully liquid fuel under pressure comprising a source of liquid fuel, a small container, a pump having an inlet communicating with the bottom portion of the small container and an outlet for delivering pressured fuel, an eductor in said source of fuel having a nozzle receiving pressured fuel from the pump outlet, an inlet mouth communicating with the pond of fuel of said source and a discharge tube communicating with the container, said eductor agitating the fuel entering the mouth thereof to pre-treat it, and an agitator in the container further agitating the pre-treated fuel before it enters the pump inlet.

10. A fuel system comprising a main fuel tank for liquid fuel, a small secondary tank, a first agitating flow inducer for filling the secondary tank arranged to retain an appreciable head of fuel therein from the main tank with pre-agitated fuel, and a second agitating flow inducer at the bottom of the secondary tank for further agitating the fuel in the secondary tank and pumping fully liquid fuel from said secondary tank.

11. A pumping system comprising a vented main tank, a closed small tank in the main tank, a float controlled vent in the top of the small tank, a pressure relief valve in the top of the small tank, a centrifugal booster pump having an agitator and an impeller communicating with the bottom of the small tank, and an eductor actuated by the pump and communicating with the main tank for filling the small tank, said eductor and said agitator treating the material being pumped to liberate gases and vapors therefrom through the vents.

12. The method of delivering fuel to a fuel line for preventing vapor lock in the line which comprises educting fuel from a pond into a small chamber, treating the fuel in the small chamber to release bubbles of gases and vapors therefrom, flowing the bubbles from the small chamber into the pond, venting gases and vapors out of the pond, pumping treated fuel from the chamber into a fuel line, and bleeding fuel from the line to effect said educting.

13. The method of stabilizing volatile fuel to prevent vapor lock in fuel systems which comprises agitating liquid below the surface of a pond to liberate gas and vapor bubbles from the liquid, venting liberated gas and vapor out of the pond, circulating agitated fuel in the pond, further agitating the circulated fuel to liberate additional gas and vapor bubbles therefrom, venting gas and vapor from said additional bubbles out of the fuel, and pumping out of the pond only fully liquid fuel from the agitated fuel immediately after the fuel has been agitated.

14. The method of treating volatile liquid fuel to prevent vapor lock in fuel systems while stabilizing the fuel which comprises beating liquid fuel in a pond below the surface of the pond to agitate the fuel and liberate bubbles of gas and vapor therefrom, allowing said liberated bubbles to rise to the surface of the pond, venting liberated gas and vapor out of the pond from said bubbles as they reach the surface of the pond, pumping bubble-freed fuel out of the bottom portion of the pond, recirculating some of the pumped fuel back to the pond, and further beating the thus recirculated fuel before repumping the fuel to liberate additional bubbles of gas and vapor from the fuel, allowing said additional bubbles of gas and vapor to rise to the surface of the pond, and liberating gas and vapor from said bubbles out of the pond at said surface of the pond.

EWALD J. KIMM.
BERNARD R. BELLMANN.

REFERENCES CITED

The following references are of record in the file of this patent:

UNITED STATES PATENTS

| Number | Name | Date |
|---|---|---|
| 2,300,332 | Avigdor | Oct. 27, 1942 |
| 2,325,931 | Avigdor | Aug. 3, 1943 |
| 1,734,507 | Westling et al. | Nov. 5, 1929 |
| 1,857,004 | Rebillet | May 3, 1932 |
| 2,178,994 | Inglis | Nov. 7, 1939 |

FOREIGN PATENTS

| Number | Country | Date |
|---|---|---|
| 378,906 | German | Aug. 7, 1923 |
| 639,524 | French | Mar. 10, 1928 |